US008898582B2

(12) United States Patent  (10) Patent No.: US 8,898,582 B2
Law et al.  (45) Date of Patent: Nov. 25, 2014

(54) CONFIGURABLE HIGHLIGHTS PANEL FOR DISPLAY OF DATABASE RECORDS

(75) Inventors: Margaret Law, San Francisco, CA (US); Evan Moses, San Francisco, CA (US); Rashmi Channarayapattna, Dublin, CA (US); Elena Schneider, San Francisco, CA (US); Ian Swinson, Oakland, CA (US); Jason Ellis, Geneva, IL (US); David Yung, Concord, CA (US)

(73) Assignee: salesforce.com, inc., San Francisco, CA (US)

( * ) Notice: Subject to any disclaimer, the term of this patent is extended or adjusted under 35 U.S.C. 154(b) by 83 days.

(21) Appl. No.: 13/044,435

(22) Filed: Mar. 9, 2011

(65) Prior Publication Data

US 2011/0225527 A1  Sep. 15, 2011

Related U.S. Application Data

(60) Provisional application No. 61/316,177, filed on Mar. 22, 2010, provisional application No. 61/312,617, filed on Mar. 10, 2010.

(51) Int. Cl.
G06F 3/048 (2013.01)
G06Q 10/10 (2012.01)

(52) U.S. Cl.
CPC ..................... G06Q 10/10 (2013.01)
USPC ............ 715/764; 715/765; 715/766; 715/771

(58) Field of Classification Search
CPC .............................. G06F 3/0481; G06F 3/0482
USPC .................... 715/764, 765, 766, 771
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

OTHER PUBLICATIONS

David Schach, "New Opportunity Paye Layout—With Highlights Panel," Feb. 18, 2010, x2od.com, pp. 1-15.*

(Continued)

Primary Examiner — Kieu Vu
Assistant Examiner — Asteway T Gattew
(74) Attorney, Agent, or Firm — Weaver Austin Villeneuve & Sampson LLP

(57) ABSTRACT

Systems and methods for configuring a UI display layout for displaying record fields in a multi-tenant on-demand database service. A data record is initially displayed on a first portion of a user interface display, and an identification of a set of one or more fields of the data record is received, e.g., from a user. A selection of a display configuration for the set of identified fields is also received, e.g., from a user. The display configuration may include one or more columns, each column having one or more rows, wherein the display configuration identifies, for each of the set of fields, in which column and row the field is to be displayed. Data for the set of fields based on the selected display configuration is then displayed on a second portion of the user interface display which may include a collapsible display panel.

19 Claims, 13 Drawing Sheets

(56) References Cited

U.S. PATENT DOCUMENTS

| | | |
|---|---|---|
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,015,495 B2 | 9/2011 | Achacoso et al. |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0105911 A1* | 8/2002 | Pruthi et al. ............... 370/241 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0164915 A1* | 6/2009 | Gasn et al. ............... 715/753 |
| 2012/0233137 A1 | 9/2012 | Jakobson et al. |
| 2012/0290407 A1 | 11/2012 | Hubbard et al. |
| 2013/0218948 A1 | 8/2013 | Jakobson |
| 2013/0218949 A1 | 8/2013 | Jakobson |

OTHER PUBLICATIONS

David Schach, "Dreamforce Keynote—Chatter and the Platform," Nov. 18, 2009, x2od.com, pp. 1-3.*

"Google Plus Users", Google+Ripples, Oct. 31, 2011 [retrieved on Feb. 21, 2012 from Internet at http://www.googleplusers.com/google-ripples.html], 3 pages.

* cited by examiner

| Opportunity Owner | Order Number | Type | Lead Source |
|---|---|---|---|
| Jaime Sommers [Chang] | 908676 | New Business | Trade Show |
| Product Interest: | | Tracking Nu: 830150301420 | |

FIG. 4a: *4 columns, 2 x 1 x 2 x 1 fields.*

Type
New Business

Tracking Number: 830150301420

FIG. 4b: *1 column, 2 fields.*

| Type | Next Step |
|---|---|
| New Business | Prepare an estimate. Speak with customer's VP to confirm proposed terms of deal. Suggest a Plan A discount level if there's pushback. Confirm with Joe what max discount I can offer. |
| Stage: Perception Analysis | |

FIG. 4c: *2 columns, 2 x 1 fields.*

| Type | Next Step | Amount |
|---|---|---|
| New Business | Prepare an estimate. Speak with customer's VP to confirm proposed terms of deal. Suggest a Plan A discount level if there's pushback. | $70,000.00 |
| Stage: Perception Analysis | | Close Date: 2/9/2010 |

FIG. 4d: *3 columns, 2 x 1 x 2 fields.*

FIG. 5a: Zoom a full-height field occupying an entire column.

FIG. 5b: Zoom a top field.

FIG. 5c: Zoom a bottom field.

CONFIGURABLE HIGHLIGHTS PANEL FOR DISPLAY OF DATABASE RECORDS

CROSS-REFERENCES TO RELATED APPLICATIONS

This application claims the benefit of U.S. Provisional Application Ser. No. 61/316,177, filed Mar. 22, 2010, and U.S. Provisional Application Ser. No. 61/312,617, filed Mar. 10, 2010, the disclosures of which are each incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to displaying data, and more particularly to configurable user interface displays for use with data accessible via an on-demand database and/or application service.

In current display technologies for displaying database objects, a user is often provided with a set display of pre-selected fields for a displayed object or record. The displayed set of fields is typically set by an administrative user. An end user may have some flexibility in adjusting the display, but generally this is limited to selecting, on a recurring basis, which fields may be displayed. In general there are no mechanisms that allow a user to specify object display highlighting characteristics such as which fields are to be displayed, and in which order, in a prominent manner.

It is desirable to provide systems and methods that allow for personalized highlighting of certain selected object fields in a consistent and persistent, yet adjustable, manner.

BRIEF SUMMARY

Embodiments relate generally to user interface displays, and more particularly to configurable user interface displays for use with data accessible via an on-demand database and/or application service. In various embodiments, methods for practicing novel techniques, systems having elements or components configured to implement the novel techniques, as well as devices and computer-readable storage media storing executable code and/or instructions for implementing the novel techniques are disclosed herein.

Systems and methods are provided for user configuration of a UI display layout for displaying record fields in a multi-tenant on-demand database service. A data record is initially displayed on a first portion of a user interface display, and an identification of a set of one or more fields of the data record is received, e.g., from a user. A selection of a display configuration for the set of identified fields is also received, e.g., from a user. The display configuration may include one or more columns, each column having one or more rows, wherein the display configuration identifies, for each of the set of fields, in which column and row the field is to be displayed. Data for the set of fields based on the selected display configuration is then displayed on a second portion of the user interface display which may include a collapsible display panel.

According to one embodiment, a method is provided for configuring a user interface display for display of fields of a data record. The method typically includes receiving an identification of a set of one or more fields of the data record, and receiving a selection of a display configuration for the set of identified fields, the display configuration including one or more columns, each column having one or more rows, wherein the display configuration identifies, for each of the set of fields, in which column and row the field is to be displayed. The method also typically includes displaying, on a second portion of the user interface display, data for the set of fields based on the selected display configuration, wherein data for the record is displayed on a first portion of the UI. In certain aspects, the method also includes displaying data for a data record on a first portion of a user interface display prior to the receiving steps to allow for selection of record or interaction with the UI to identify the set of records and/or the display configuration by a user.

According to another embodiment, a computer readable storage medium is provided that stores computer code, which when executed by a processor, configures a user interface display for display of fields of a data record. The code typically includes instructions to display data for a data record on a first portion of a user interface display, to receive an identification of a set of one or more fields of the data record, and to receive a display configuration for the set of identified fields, the display configuration including one or more columns, each column having one or more rows, wherein the display configuration identifies, for each of the set of fields, in which column and row the field is to be displayed. The code also typically includes instructions to display, on a second portion of the user interface display, data for the set of fields based on the selected display configuration.

According to yet another embodiment, a computer system is provided that typically includes a display device for displaying a user interface display, a database that stores one or more data objects or records, each object or record including a plurality of data fields, and a processor. The processor is typically configured to communicate with the database, to generate display data for a data record for display on a first portion of the user interface display on the display device, to receive an identification of a set of one or more fields of the data record and to receive a display configuration for the set of identified fields, the display configuration including one or more columns, each column having one or more rows, wherein the display configuration identifies, for each of the set of fields, in which column and row the field is to be displayed. The processor is also typically configured to generate display data for the set of fields based on the selected display configuration for display on a second portion of the user interface display.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 4 shows examples of an HP configured with one or multiple fields in one or more columns.

FIG. 5 shows examples of zoomed states according to one embodiment.

FIG. 7 shows an example of a UI screen with page layout editing functionality according to one embodiment.

FIG. 8 shows a UI screen for accessing configuration tools

DETAILED DESCRIPTION

The present invention provides systems and methods for displaying data, and more particularly configurable user interface displays for use with displaying data accessible via an on-demand multi-tenant database and/or application service.

As used herein, the term multi-tenant database system or service refers to those systems in which various elements of hardware and software of the database system may be shared by one or more entities or customers. For example, a given application server (e.g. running an application process) may simultaneously process requests for a great number of customers, and a given database table may store rows for a potentially much greater number of customers. As used herein, the term query plan refers to a set of steps used to access information in a database system.

System Overview

Figure 1:
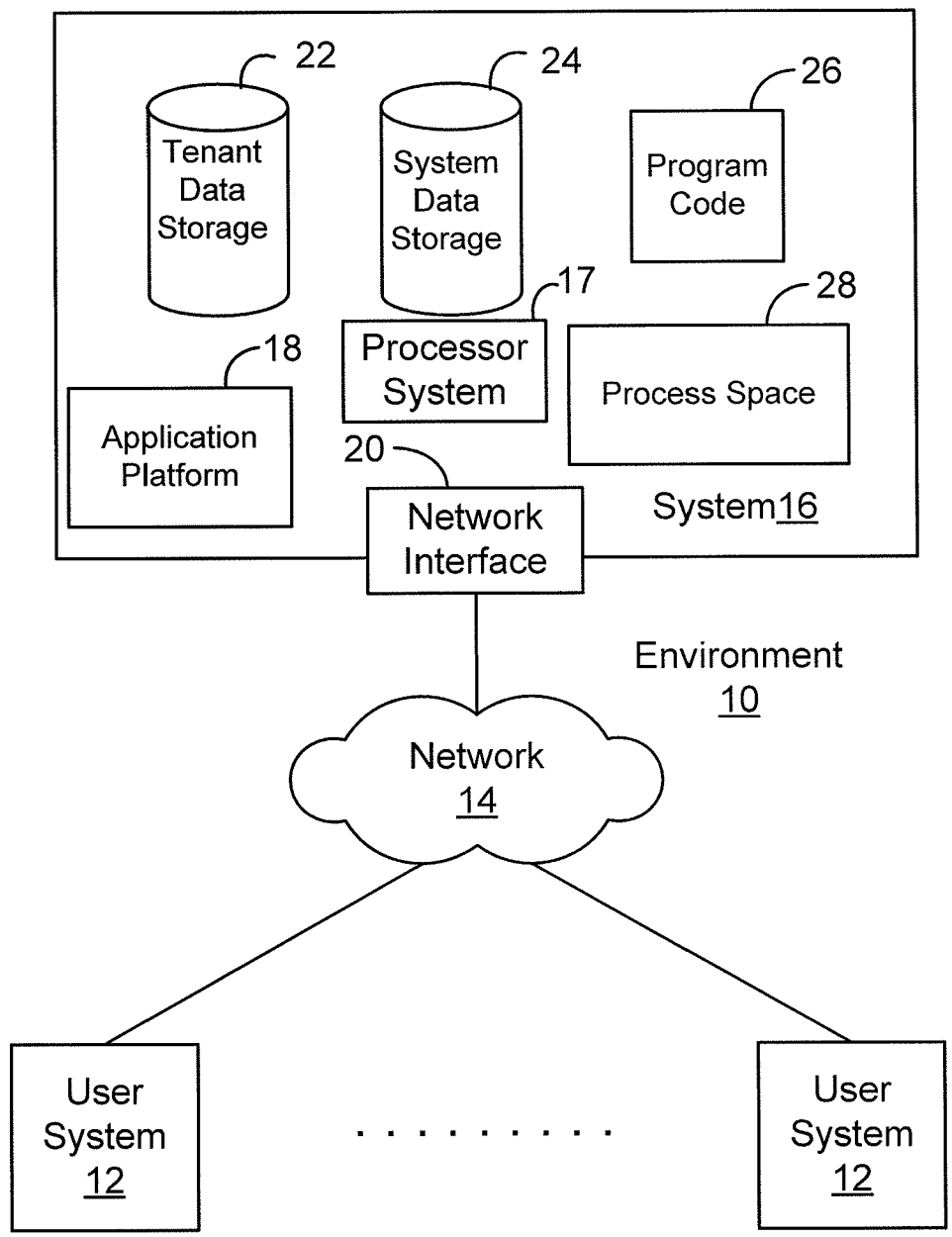
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application (s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
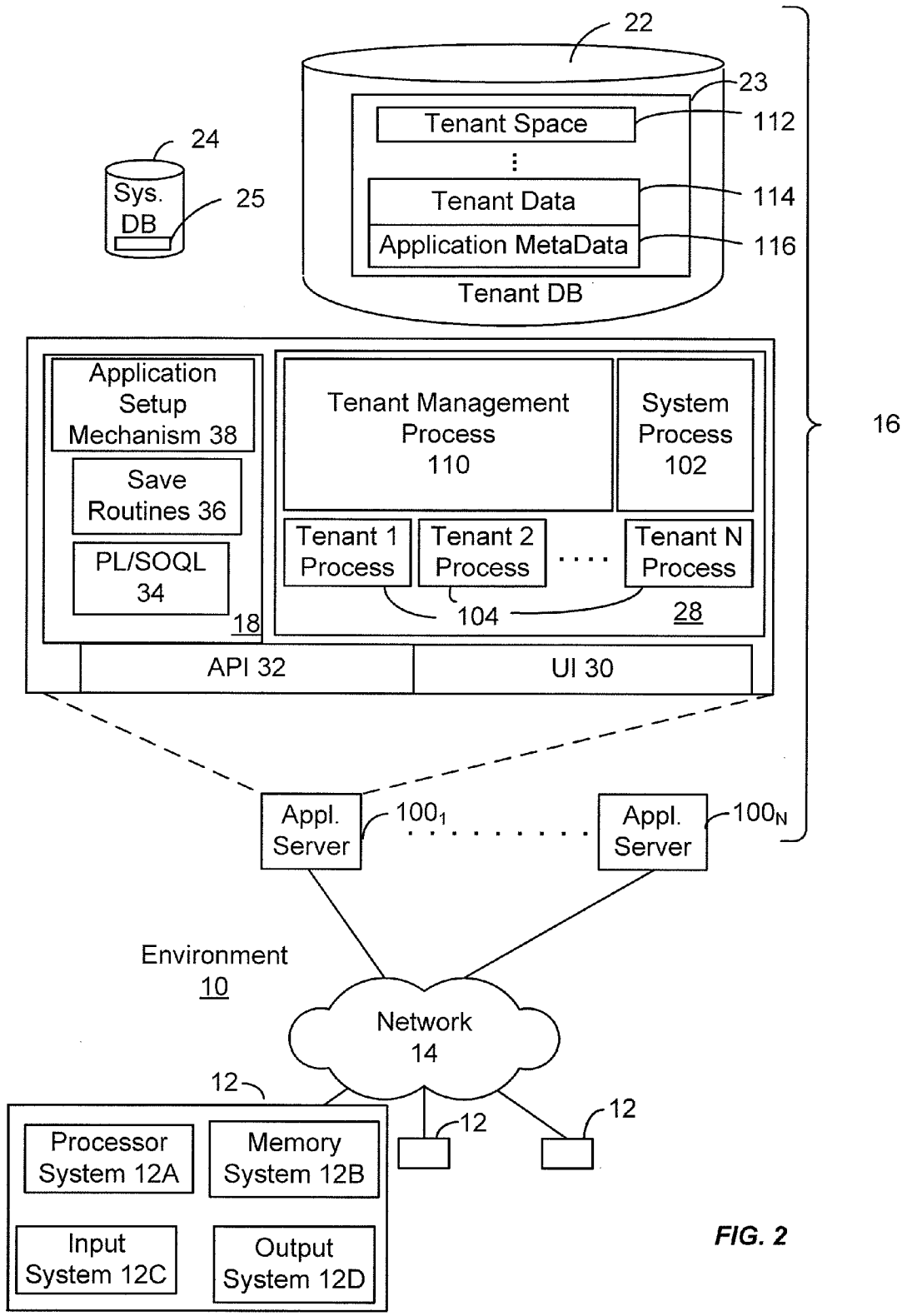
FIG. 2 illustrates a block diagram of an embodiment of elements of FIG. 1 and various possible interconnections between these elements according to an embodiment of the present invention.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record of a table contains an instance of data for each category defined by the fields. For example, a CRM database may include a table or object that describes a customer with fields for basic contact information such as name, address, phone number, fax number, etc. Another table might describe a purchase order, including fields for information such as customer, product, sale price, date, etc.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system.

In general, it is desirable to provide systems and methods that allow users to configure the layout of data to be displayed. Accordingly, in one embodiment, a configurable and collapsible banner on a database object or record display is provided that allows one to configure the user interface to display data fields in a meaningful order and to allow for quick and easy access to full visibility of the content of the data record(s) displayed. The discussion herein refers generally to data records, but it should be appreciated that the various embodiments disclosed herein are applicable to any database object.
Highlights Panel (HP)

Figure 3A:
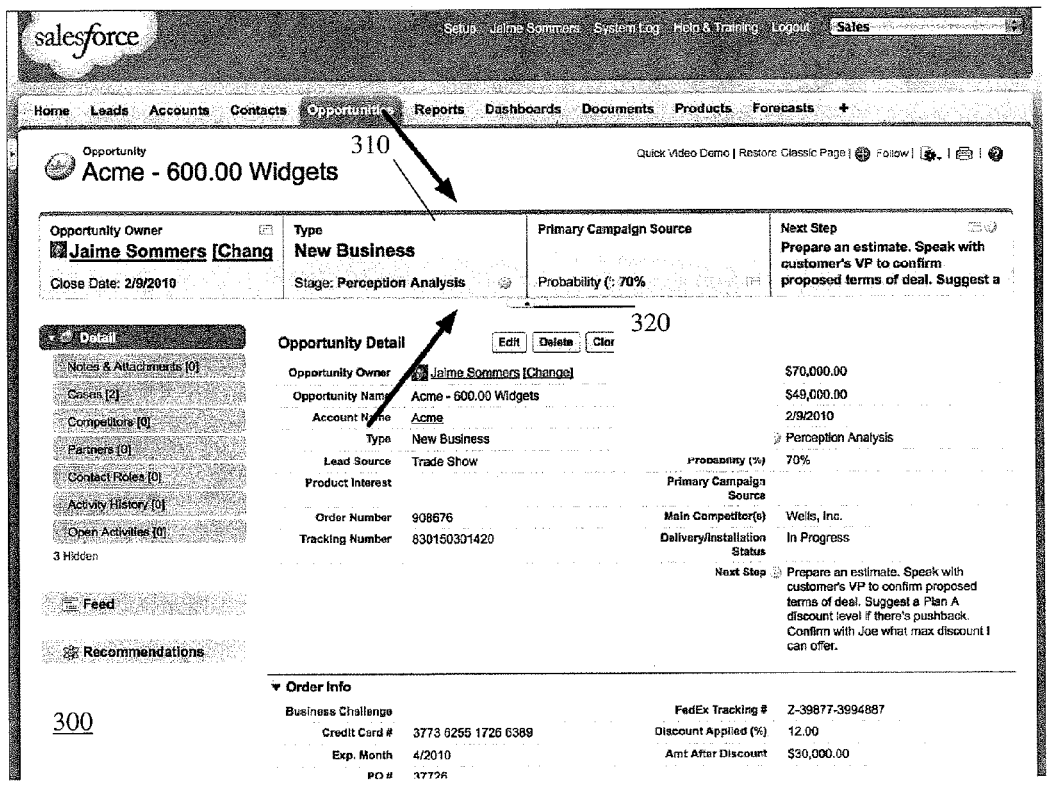
FIG. 3a illustrates an example of a Highlights Panel on User Interface page according to one embodiment.
Figure 3B:
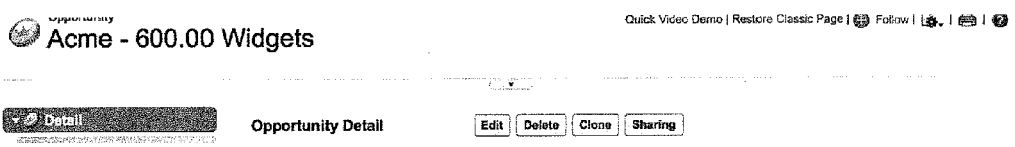
FIG. 3b illustrates a portion of UI page with the Highlights Panel in a collapsed state.

According to one embodiment, a detail page design featuring a "highlights panel" (HP) is provided that promotes, or highlights, certain fields to a prominent location for a record. FIG. 3a illustrates an example of a HP 310 on User Interface page 300 for an opportunity object according to one embodiment. The HP is configurable to include one or multiple columns, each with one or more data fields displayed. In certain aspects, a user is able to collapse or expand the HP, as desired, using a handle button 320 (shown with an upward pointing arrow to indicate an expanded state) located at bottom edge, center as shown in one embodiment. It should be appreciated that button 320 can be located elsewhere on the display, and may look different or include a different icon. FIG. 3b illustrates a portion of UI page 300 in a collapsed state, e.g., after selection of handle button 320 by a user. As shown, the collapsed state of the HP may look like a horizontal rule with a handle button (shown with a downward pointing arrow to signify a collapsed state). In certain aspects, if collapsed, the HP will be collapsed on the records of that object type (e.g., opportunity); if expanded, likewise the HP is expanded on the records of that object type.

In one embodiment, the HP can be configured with one or multiple (e.g., 1-8 or more) fields of any data type, in one or multiple columns (e.g., 1-4 or more columns with 1 or more fields per column). In certain aspects, if there is only 1 field in a given column, that field is top-aligned and given the full height of the column to display its data. A few examples are shown in FIG. 4. FIG. 4a shows a 4 column HP for an opportunity object with the first column having 2 fields displayed, the second column having 1 field, the third column 2 fields and the fourth column 1 field ("4 columns, 2×1×2×1"). FIG. 4b shows an HP with a single column for 2 displayed fields. FIG. 4c shows an HP with two columns, the first column having 2 displayed fields and the second column having a single displayed field. It is noted that first column of FIG. 4c has been configured to include fields that differ from the fields shown in the single column of FIG. 4b. FIG. 4d shows an HP with three columns, the first having 2 displayed fields, the second having a single displayed field and the third column having 2 displayed fields.

Figures 5A, 5B, 5C:
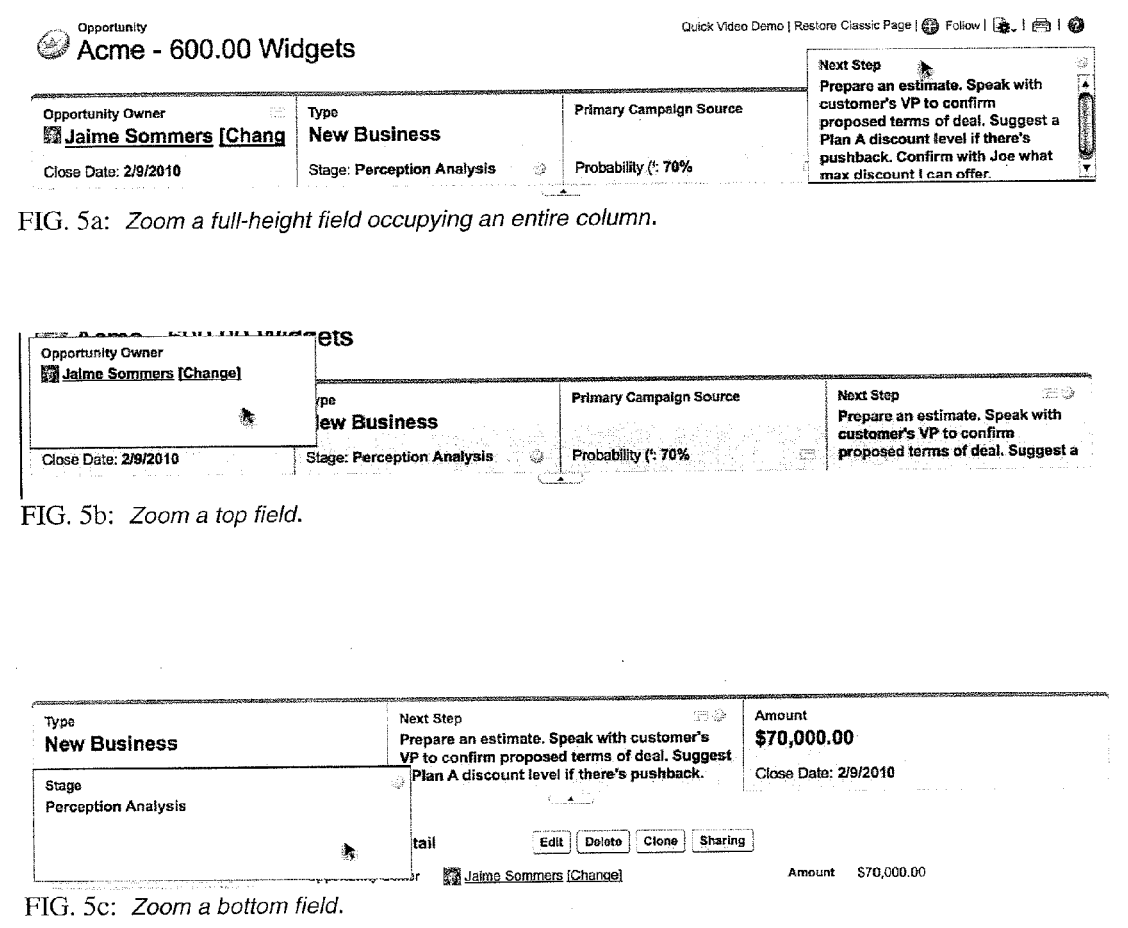

In certain aspects, a user can click directly onto any of the displayed fields to see an expanded or "zoomed" state (e.g., the cell animates to a larger size and may offer vertical and/or horizontal scrollbars). FIG. 5 shows examples of zoomed states according to one embodiment. FIG. 5a shows a zoomed view of a full height field occupying an entire column. FIG. 5b shows a zoom of a top field (of two fields) selected by a user, and FIG. 5c shows a zoomed state of the bottom field (selected by the user).

Figure 6:
FIG. 6 shows distinct borders around fields according to one embodiment.

In certain aspects, the bottom fields are not displayed as flat (e.g., label to the left of the data), but are displayed in a stacked manner (e.g., label above the data, as the top fields are). In one embodiment, each field of HP 310 is displayed with a distinct border as shown in FIG. 6. As shown, the first three columns each include two fields, each displayed with a border area, whereas the fourth column includes a single field.

Figures 7, 8:
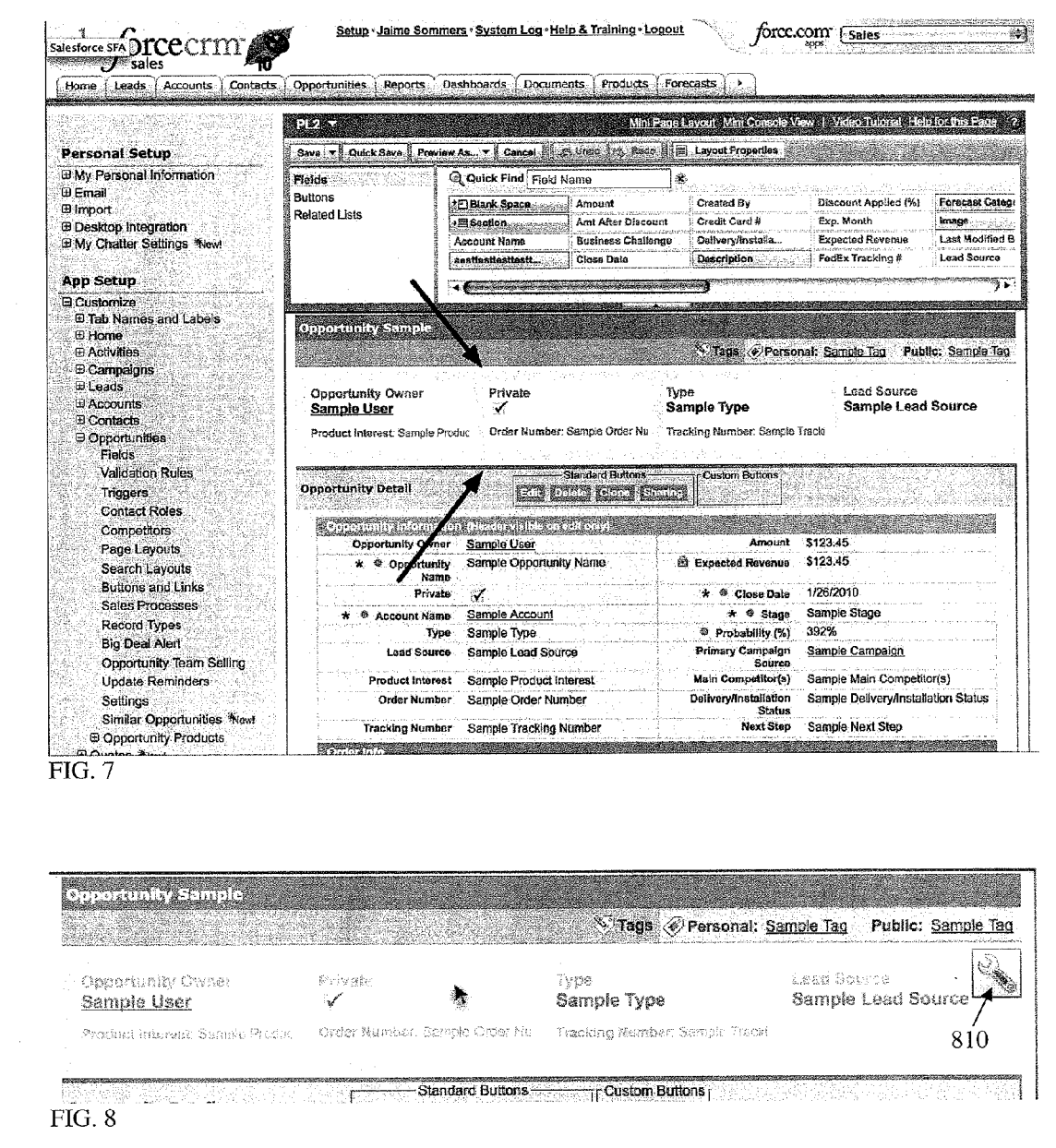
Figure 9:
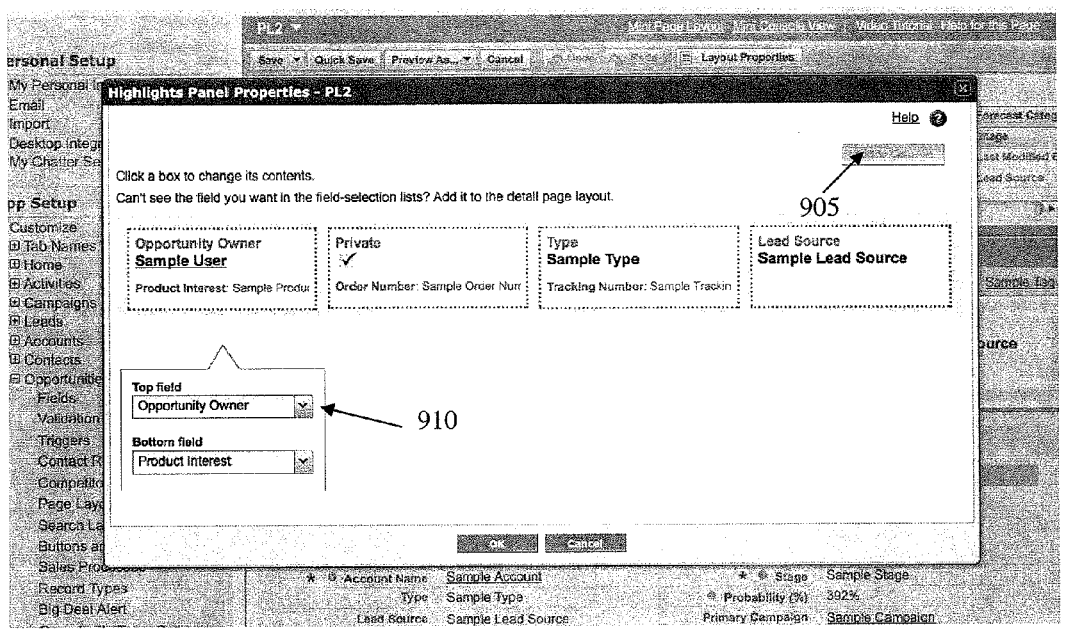
FIG. 9 shows a dialog box for configuration.

In one embodiment, a page layout editor allows for a user to configure which fields are included into a HP. FIG. 7 shows an example of a page layout editor UI screen with page layout editing functionality according to one embodiment. In certain aspects, functionality generally includes a search box to quickly search for fields of the object for display, a listing of available fields of the object, save functionality and links to configurable layout properties (e.g., to select number of columns) as shown. To access HP configuration tools in a dialog box as shown in FIG. 9, a user may (e.g., in one embodiment) either double-click the HP on the layout, or single-click on the wrench icon that becomes visible when a user's mouse hovers over the panel (810 as shown in FIG. 8). From here, a user can configure columns, e.g., to add or delete or reorder columns and to populate columns. To populate columns, in certain aspects, a user selects any column and is presented with a bubble 910 pointing to the selected column. In this bubble, one is able to select one or more fields (or none) to be placed in the column. When selected, a generic representation of that field is shown inside the column, including sample data. For example, one can see that the top field ("private") in column 2 is a binary checkbox field type. Eligible HP fields include those belonging to the set of fields available from the stored object. These available fields may or may not already be displayed elsewhere in the layout (i.e., the detail area in the lower portion of FIG. 7).

Figure 10:
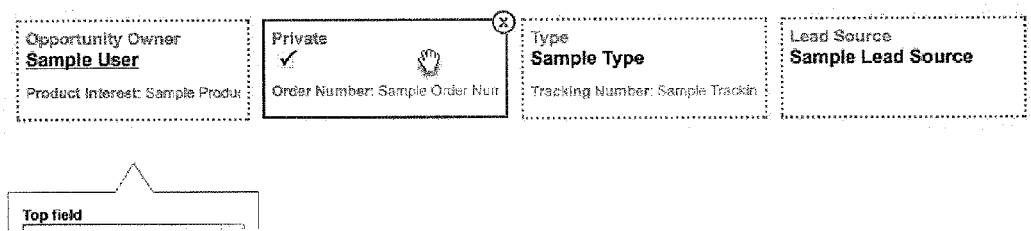
FIG. 10 shows a control to remove columns.

As shown in FIG. 10, in certain aspects, a user may hover over a column to access a control ("X") that allows the user to remove the column entirely. A column may be added by clicking an "Add a Column" button 905 (shown in FIG. 9 in a disabled state to reflect that no more columns may be added while the maximum number of columns are already present; 4 columns are shown in the present example, but the maximum number of columns may be greater than 4). In certain aspects, drag and drop functionality is used to allow a user to reorder the columns that have already been configured. When done, a user may save the layout, e.g., by selecting an "OK" button to dismiss the dialog, then by selecting the "Save" button on the layout. The configuration is then stored to the database system. The new configuration will be used for records or layouts that employ that particular layout. In certain aspects, a feature that allows a user to apply the current HP configuration to other records/layouts is provided. A list of eligible layouts is displayed and a user may select to which layouts they would like the current HP to be applied. Possible layouts include those already containing the fields used in the current HP.

Field Selection

Figure 11:
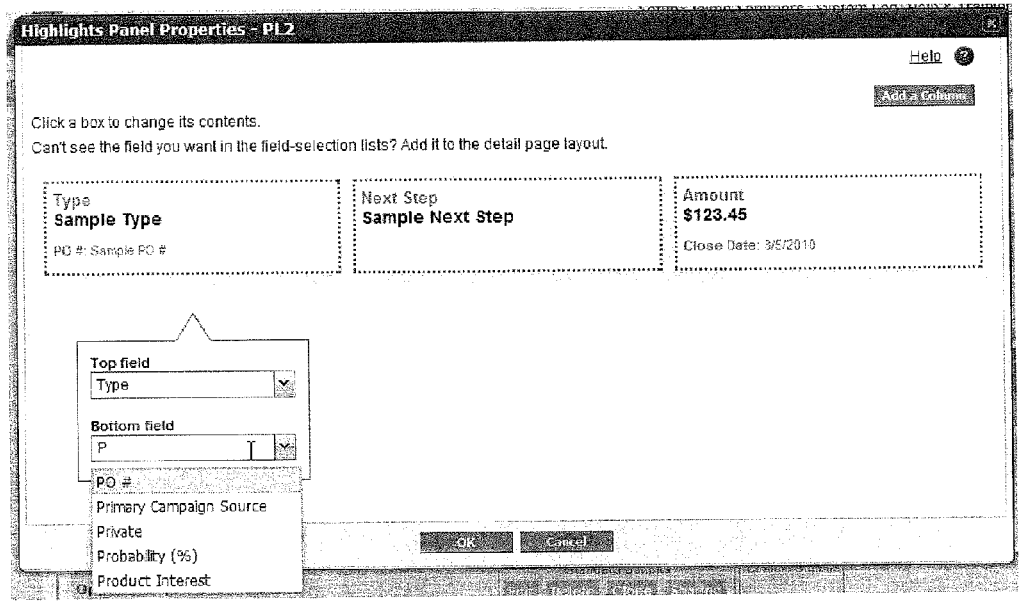
FIGS. 11-14 illustrate different UI features according to certain embodiments.
Figure 12:
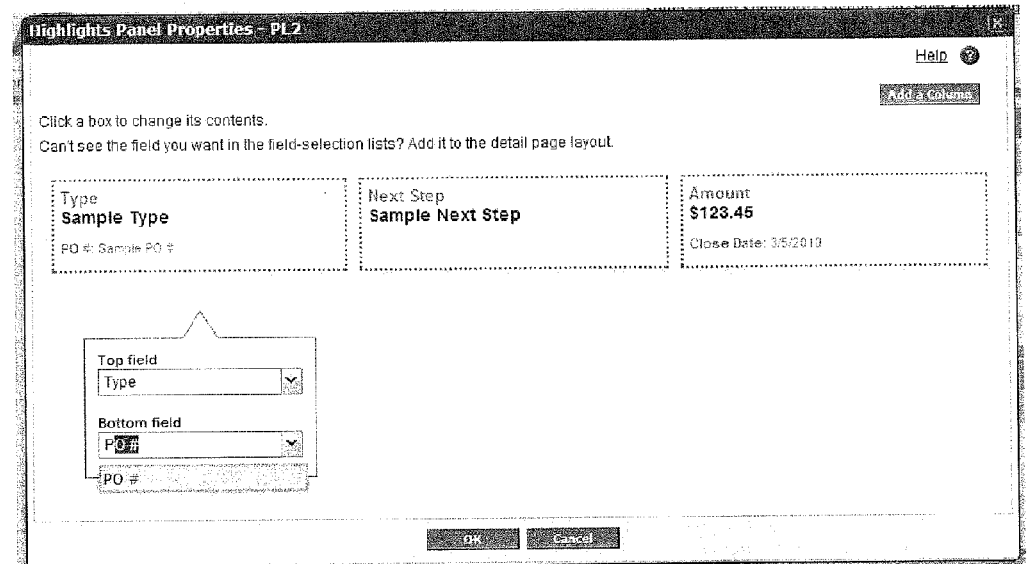
Figure 13:
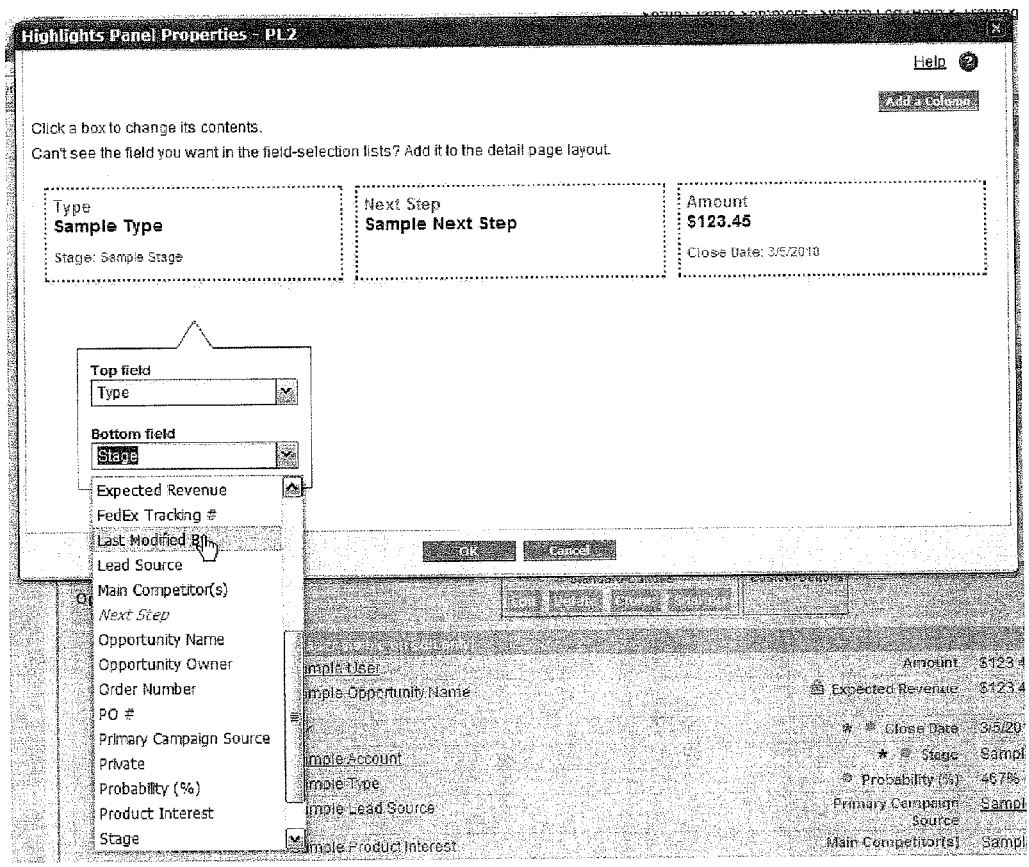
Figure 14:
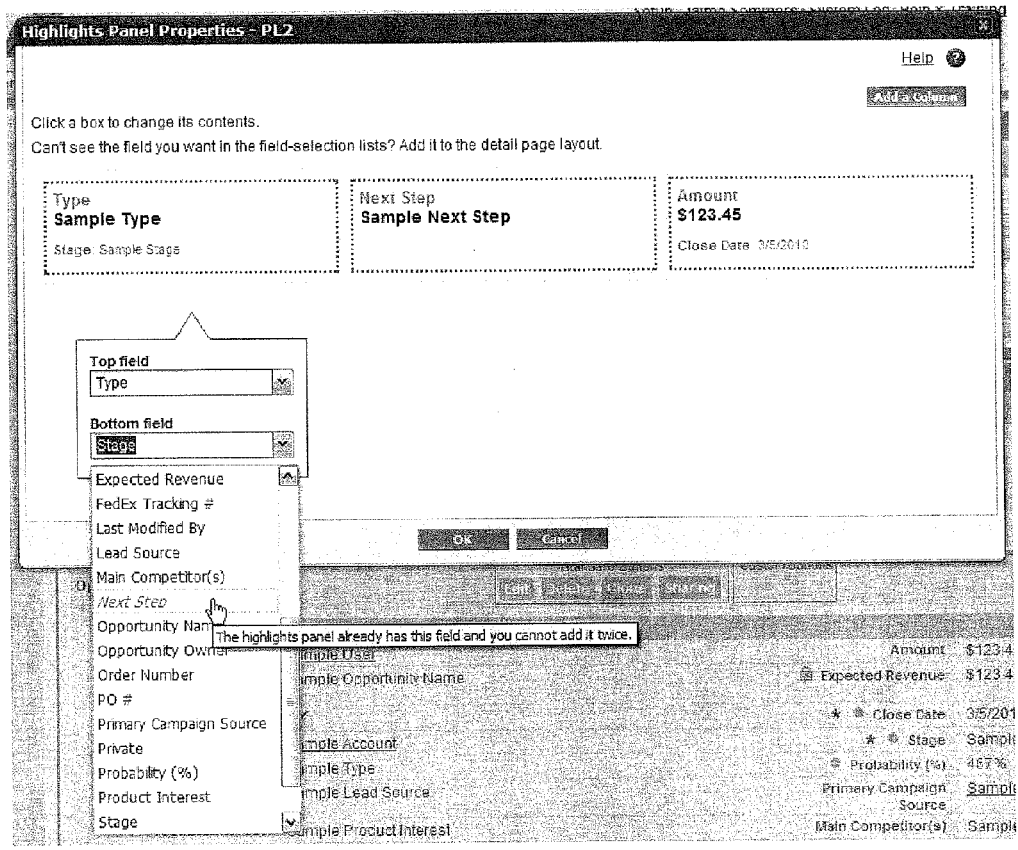

Field picker menus in the administrator configuration dialog provide various features to the user. In one embodiment, a menu control is provided in box 910 (or elsewhere) that allows a user to place the cursor inside and manually type a value. With each character typed, a drop-down menu of possible values filters down to only those that match the characters typed. For example, as shown in FIG. 11, when the user types "P", the menu values shown are only those fields beginning with P. After a brief pause, an auto-complete feature fills in the remaining text value with the first eligible menu option as shown in FIG. 12. These behaviors are intended to facilitate the task of finding a single field from a (long) list. The behaviors are enabled, in certain aspects, using javascript. If the user doesn't employ the auto-complete function and instead clicks the "v" (down arrow) button, the full menu of eligible fields will appear. In one aspect, "eligible" fields includes those fields already placed into the detail area. In one aspect, selectable values appear as plain black text as shown in FIG. 13, and non-selectable values are grayed out and/or italicized. A tooltip, visible on hover, for example, explains why this value is not selectable as shown in FIG. 14. A "Clear All" feature, e.g., represented as a button or link, is provided in certain aspects. Selection of Clear All would reset all selectable values to "-None-".

Default Highlights Panel Generation

In one embodiment, to facilitate the task of creating a highlights panel (HP) for each layout, a default HP is generated under the following circumstances:

1. When a new detail page design feature is enabled for a given organization or entity. In this case, a default HP is automatically generated for each layout that had previously been created and saved.

2. When a user creates a new page layout.

Figure 15:
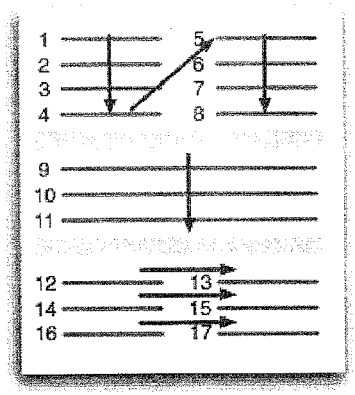
FIGS. 15 and 16 illustrate aspects of an algorithm used to select fields from a page layout for automatically generating a Highlights Panel.
Figure 16:
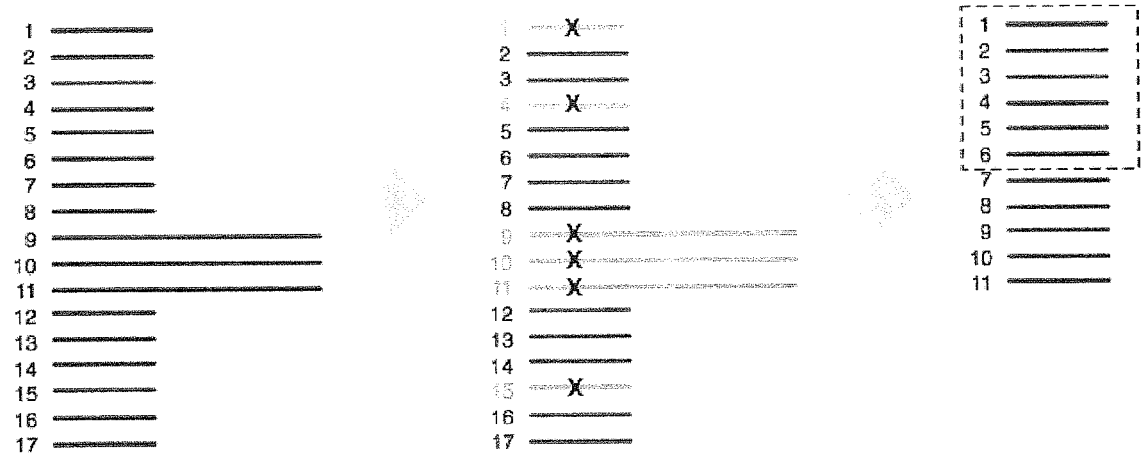

FIGS. 15 and 16 illustrate embodiments of how a default HP is automatically generated for any given page layout when the parent feature is enabled or for a newly-created layout. The system creates an HP and populates it with at most N fields (N is an arbitrary number, e.g., N=6, or N=7). The top N eligible fields are selected based on how they are already laid out on the page, in a priority order dictated by the tab order defined by the administrator (for example, some layouts may allow an administrator to define tab order for sections of fields—top-to-bottom or left-to-right—and those sections may be defined either as 1 or 2 columns.)

To support the first event, above, automated guesses about the top N most important and most appropriate fields to feature in the HP are made, based for example on the configuration of the previously saved layout. For example, in one embodiment, N=7 fields, which are placed into an auto-generated 4-column, 2-row HP. In another embodiment, N=4 with a 4-column, 1-row HP. Other values of N may be used.

An algorithm for selecting the top N fields is provided that is based on the following considerations:

a. which fields are already placed on the detail area?
b. which fields can be safely eliminated as inappropriate for the HP?
c. how has the detail area's tab order been configured?

In one embodiment, regarding a., only fields that have been placed onto the detail area are eligible to be featured in the HP and all other fields are initially disqualified. In one embodiment, regarding b., certain standard fields can safely be disqualified because they are inherently poor choices for inclusion in the HP. For example, the Name field can be initially disqualified as it is already featured prominently in the title bar just above the HP. In one embodiment, regarding c., detail area tab order configuration can vary across multiple sections within a page layout, and can be defined as either top-to-bottom or left-to-right. One algorithm assumes a corollary to the administrator's layout prioritization—important fields are placed at the top. FIG. 15 illustrates examples of possible layouts according to certain embodiments. As shown in FIG. 15, an example layout is divided into 3 sections, where the top section has 2-columns with top-to-bottom tab order, the middle section has 1-column with top-to-bottom tab order, and the bottom section has 2-columns with left-to-right tab order.

In one embodiment, adhering to the predefined tab order, a list of all detail area fields is created, eliminating the obvious rejects (per consideration b.), then the top N are selected for inclusion in the default HP. If, after filtering, the resulting set is fewer than N fields, the full set can be used. The top N fields are placed in a consistent, though somewhat arbitrary, order. FIG. 16 describes a process by which fields found in this layout are selected. First (left-most illustration), the fields are stacked in order. Next (middle illustration), fields that are ineligible are eliminated from being included in the HP. For example, a field may be ineligible due to field level security rules, field type, or possibly other reasons. Finally (right-most illustration), the top N (e.g., 6) are grabbed from the list. What FIGS. 15-16 don't illustrate is that there may be fewer than N eligible fields. In such cases, the HP is populated with as many eligible fields as there are. If no eligible fields remain, an empty HP state remains. In certain aspects, an empty state has certain characteristics:

a. An administrator or other user cannot save a page layout with a completely empty HP—i.e., with all HP fields set to a "-None-" field selection value, as this is an invalid state for the layout and an error will occur when the user tries to save the layout.

b. An empty column in an HP is not invalid.

c. In certain aspects, an end-user may view a record that features an HP whose every field is hidden from that user, e.g., due to field-level security rules. In this case, the HP will appear to contain only empty columns. In one embodiment, a special "empty state" HP is shown, which contains an empty state message d. In certain aspects, an end-user may view a record that features an HP, where one or more but not all of its fields are hidden. In this case, depending on column/field arrangement and which particular fields are hidden, the HP may display fewer columns and/or its fields may shift position to take advantage of the newly-opened spaces. This behavior has the added benefit of making it less obvious to the user that fields are hidden.

Figure 17:
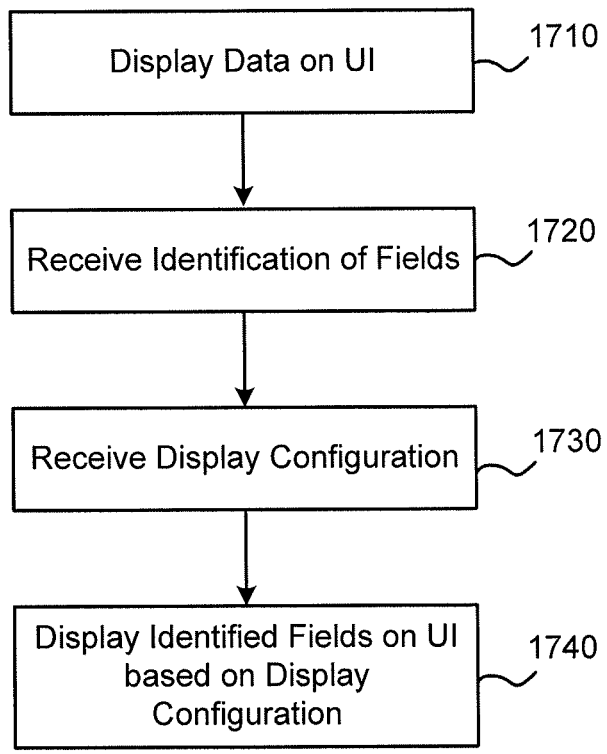
FIG. 17 illustrates a flow chart of a method for configuring a user interface display layout for displaying fields of a data record or other object according to one embodiment.

FIG. 17 illustrates a flow chart of a method for configuring a user interface display layout for displaying fields of a data record or other object according to one embodiment. In step 1710, data for a data record is initially displayed on a first portion of a user interface display. In step 1720, an identification of a set of one or more fields of the data record is received. In certain aspects, the identification of the set of fields is automatically generated, e.g, in response to user preferences, in response to a default HP generating algorithm, or otherwise. In certain aspects, the identification of the set of fields is generated in response to one or more user selections or interactions with the UI. In step 1730, a selection of a display configuration for the set of identified fields is received. The display configuration may include one or more columns, each column having one or more rows, wherein the display configuration identifies, for each of the set of fields, in which column and row the field is to be displayed. In certain aspects, the received display configuration is generated based on one or more user selections or interactions with the UI. In certain aspects, the received display configuration is generated based on a stored configuration associated with the user and/or the record or record type. In certain aspects, the received display configuration is generated based on an algorithmic determination of the top fields. In step 1740, data for the set of fields based on the selected display configuration is displayed on a second portion of the user interface display. In certain aspects, the second portion of the display includes a collapsible display panel. It should be appreciated that step 1710 is optional, and that the identification of a set of one or more fields can be generated prior to any initial display of information.

Data Model

The Highlights Panel Layout represents the metadata for a type of layout, which, in certain aspects contains a few fields (e.g., <10) and some display options. Existing Detail Layout metadata may be too cumbersome to use for this purpose, because it assumes the existence of Layout Sections, which the Highlights Panel may not use. Also, although each Highlights Panel Layout is associated with a Detail Layout, since the fields in the Highlights Panel are not necessarily a subset of the fields in the associated Detail Layout, one can't simply add more columns to a layout_item object.

According to one embodiment, a model is provided that is generic enough to represent various types of layouts that may be created in the future. In certain aspects, the design is sufficiently flexible to make changes without re-working the data model.

Examples of useful Tables include core.summary_layout, core.summary_layout_item and core.summary_layout_slice_info as follows (summary_layout_type will be an enum type):

| core.summary_layout | | |
|---|---|---|
| Field | Type | Nullable |
| organization_id | char(15) | NO |
| summary_layout_id | char(15) | NO |
| layout_id | char(15) | NO |
| namespace_prefix | varchar2(45) | YES |
| master_label | varchar2(240) | NO |

-continued

| core.summary_layout | | |
|---|---|---|
| Field | Type | Nullable |
| developer_name | varchar2(120) | NO |
| all_managed_package_member_id | char(15) | YES |
| deleted | char(1) | NO |
| options_flag1 | number | NO |
| summary_layout_type | char(1) | NO |
| summary_layout_style | char(1) | YES |
| x_size | number | YES |
| y_size | number | YES |
| z_size | number | YES |
| w_size | number | YES |

| core.summary_layout_item | | |
|---|---|---|
| Field | Type | Nullable |
| organization_id | char(15) | NO |
| summary_layout_item_id | char(15) | NO |
| summary_layout_id | char(15) | NO |
| item_enum_or_id | varchar2(120) | NO |
| pos_x | number | NO |
| pos_y | number | YES |
| pos_z | number | YES |
| pos_w | number | YES |
| various flags TBD | | |

| Field | Type | Nullable |
|---|---|---|
| organization_id | char(15) | NO |
| summary_layout_slice_info_id | char(15) | NO |
| summary_layout_id | char(15) | NO |
| axis | char(1) | NO |
| axis_pos | number | NO |
| label | varchar2(240) | YES |
| width | number | YES |
| height | number | YES |
| slice_style | char(2) | YES |

Any summary Layout can be thought of as a grid with anywhere between 1 and 4 axes. Consider this layout:

| Section 1 | | |
|---|---|---|
| a | b | c |
| 1 | 2 | 3 |

| Section 2 | | |
|---|---|---|
| d | e | f |
| 4 | 5 | 6 |

This is a 3 dimensional layout, a 3×2×2 grid. In certain aspects, the row that represents the item for e would look like:

| organization_id | summary_layout_id | summary_layout_item_id | item_enum_or_id | pos_x | pos_y | pox_z | pos_w |
|---|---|---|---|---|---|---|---|
| 00DORGID | 00SUMMARYLAYOUT | 01SUMMARYITEM | FieldE | 1 | 0 | 1 | NULL |

This indicates that item e is in the second column (pos_x=1), first row (pos_y=0), second section (pos_z=1). Any axes that are unused are filled with NULLs. Information such as section name is stored in a summary_layout_slice_info row, which stores information about a particular row, column, or section; e.g., it stores information about a specified point on a specified axis. In certain aspects, the summary_layout_slice_info row for Section 2 would look like this:

| organization_id | summary_layout_slice_info_id | summary_layout_id | axis | axis_pos | label | width | height | slice_style |
|---|---|---|---|---|---|---|---|---|
| 00DORGID | 00SUMMARYSLICE | 00SUMMARYLAYOUT | z | 1 | Section 2 | NULL | NULL | NULL |

The Z axis represents the section, so the axis_pos indicates which section this row refers to. Width and Height might be used in a layout where each section has a different grid size. Note that these don't have to be pre-specified. A two-column section might have width=2, height=NULL, to indicate that the height is unbounded. The height of that section would be calculated from the number of items in that section, or, for example,

```
SELECT MAX(pos_y)
FROM core.summary_layout_item
WHERE organization_id = :1
AND summary_layout_id = :2
AND pos_z = 1;
```

Cacheable Info

In one embodiment, the summary_layout data is stored in the cache, with a SummaryLayoutInfo analogous to LayoutInfo. SummaryLayoutInfos will contain an array of SummaryLayoutItemInfos, and an array of SummaryLayoutSliceInfos. SummaryLayoutInfo will have getters that allow one to retrieve a particular SummaryLayoutItemInfo by coordinate, or to retrieve a sorted list of SummaryLayoutItemInfos. LayoutInfo will have a reference to its associated SummaryLayoutInfo. In another embodiment, SummaryLayoutInfo, DefaultSummaryLayoutInfo will be created from an EntityCommon, and used when there is no summary_layout in the database for a given layout. One will be able to specify SummaryLayout in the Udd for standard entities as a new tag, <summaryLayout>.

In certain aspects, the template could be stored on summary_layout.summary_layout_style, but if it specified properties that should properly be stored on summary_layout_slice_info, then one has to choose between storing it in the DB or coding it, e.g., in Java. If the administrator or other user is never allowed to modify the template, then it would make more sense to put the style definition in Java and leave it out it of the DB.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of configuring a user interface display for display of one or more fields of a data record, the method comprising:
    displaying data associated with the data record on a first portion of the user interface display;
    receiving an identification of a first set of one or more fields of the data record;
    receiving a first display configuration for the first set of fields, wherein the first display configuration is generated algorithmically based on:
        (a) a previously saved display configuration,
        (b) a priority order corresponding to the order in which data is displayed in the first portion of the user interface display, and
        (c) a plurality of eligible fields identified from the first set of fields by excluding any fields determined to be disqualified for display in a second portion of the user interface display; and
    displaying, on the second portion of the user interface display, data associated with the first set of fields based on the received first display configuration,
    wherein the first display configuration includes one or more columns, each column having one or more rows,
    wherein the first display configuration identifies, for each field in the first set of fields, in which column and row the field is to be displayed,
    wherein the first display configuration comprises a listing of to N fields, which are automatically selected from the plurality of eligible fields based on the priority order, and
    wherein a number N used to select the top N fields is determined based on a number of fields associated with the rows and columns in the first display configuration.

2. The method of claim 1, wherein the identification of the first set of fields is automatically generated.

3. The method of claim 1, wherein the identification of the first set of fields is generated in response to one or more user selections.

4. The method of claim 1, wherein the second portion of the display includes a collapsible display panel.

5. A non-transitory computer readable medium that stores computer code, which when executed by a processor, configures a user interface display for display of one or more fields of a data record, the code comprising instructions configured to cause a computer to:
    display data associated with the data record on a first portion of the user interface display;
    receive an identification of a first set of one or more fields of the data record;
    receive a first display configuration for the first set of fields, wherein the first display configuration is generated algorithmically based on:

(a) a previously saved display configuration,
(b) a priority order corresponding to the order in which data is displayed in the first portion of the user interface display, and
(c) a plurality of eligible fields identified from the first set of fields by excluding any fields determined to be disqualified for display in a second portion of the user interface display; and display, on the second portion of the user interface display, data associated with the first set of fields based on the received first display configuration, wherein the first display configuration includes one or more columns, each column having one or more rows, wherein the first display configuration identifies, for each field in the first set of fields, in which column and row the field is to be displayed, wherein the first display configuration comprises a listing of to N fields, which are automatically selected from the plurality of eligible fields based on the priority order, and wherein a number N used to select the top N fields is determined based on a number of fields associated with the rows and columns in the first display configuration.

6. The non-transitory computer readable medium of claim 5, further including instructions to automatically generate the first set of one or more fields.

7. The non-transitory computer readable medium of claim 5, further including instructions to generate the first set of one or more fields in response to one or more user selections.

8. The non-transitory computer readable medium of claim 5, further including instructions to algorithmically determine the top N fields.

9. A computer system, comprising:
a display device for displaying a user interface display for display of one or more fields of a data record;
a database that stores one or more data objects or records, each object or record including a plurality of data fields; and
a processor configured to:
communicate with the database;
generate display data associated with the data record for display on a first portion of the user interface display on the display device;
receive an identification of a first set of one or more fields of the data record;
receive a first display configuration for the first set of fields, wherein the first display configuration is generated algorithmically based on:
(a) a previously saved display configuration,
(b) a priority order corresponding to the order in which data is displayed in the first portion of the user interface display, and
(c) a plurality of eligible fields identified from the first set of fields by excluding any fields determined to be disqualified for display in a second portion of the user interface display; and
generate display data for displaying data associated with the first set of fields based on the received first display configuration on the second portion of the user interface display,
wherein the first display configuration includes one or more columns, each column having one or more rows,
wherein the first display configuration identifies, for each field in the first set of fields, in which column and row the field is to be displayed,
wherein the first display configuration comprises a listing of top N fields, which are automatically selected from the plurality of eligible fields based on the priority order, and
wherein a number N used to select the top N fields is determined based on a number of fields associated with the rows and columns in the first display configuration.

10. The computer system of claim 9, wherein the database is remote from the processor, wherein the processor communicates with the database over a network.

11. The computer system of claim 9, wherein the previously saved display configuration corresponds to a stored configuration received from the database.

12. The computer system of claim 9, further including a user input device that allows a user to provide the identification of the first set of fields and the first display configuration.

13. The method of claim 1, further comprising:
receiving a second identification of a second set of one or more fields of the data record;
receiving a second display configuration for the second identified set of fields, wherein the second display configuration is generated based on one or more user selections; and
displaying, on the second portion of the user interface display, data associated with the second set of fields based on the second display configuration.

14. The non-transitory computer readable medium of claim 5, the code further including instructions to:
receive a second identification of a second set of one or more fields of the data record;
receive a second display configuration for the second identified set of fields, wherein the second display configuration is generated based on one or more user selections; and
display, on the second portion of the user interface display, data associated with the second set of fields based on the second display configuration.

15. The computer system of claim 9, wherein the processor is further configured to:
receive a second identification of a second set of one or more fields of the data record;
receive a second display configuration for the second identified set of fields, wherein the second display configuration is generated based on one or more user selections; and
display, on the second portion of the user interface display, data associated with the second set of fields based on the second display configuration.

16. The method of claim 1, wherein the priority order includes a prioritized listing of one or more fields in the first set of fields.

17. The method of claim 1, wherein the top N fields are selected based on field level security rules or field type.

18. The method of claim 1, wherein a field is determined to be disqualified for being displayed in the user interface display outside the second portion.

19. The computer system of claim 9, wherein the first display configuration is generated automatically.

* * * * *